(12) United States Patent
Chase

(10) Patent No.: US 6,269,066 B1
(45) Date of Patent: Jul. 31, 2001

(54) ELECTRONICALLY TRANSLOCATABLE OPTICAL STYLET

(75) Inventor: Roland H Chase, Lanham, MD (US)

(73) Assignee: Richard L. Scully, Banner Elk, NC (US)

( * ) Notice: Subject to any disclaimer, the term of this patent is extended or adjusted under 35 U.S.C. 154(b) by 0 days.

(21) Appl. No.: 09/035,824

(22) Filed: Mar. 6, 1998

Related U.S. Application Data

(60) Provisional application No. 60/053,682, filed on Jul. 24, 1997.

(51) Int. Cl.[7] .................................................. G11B 7/00
(52) U.S. Cl. .................. 369/126; 369/44.23; 369/44.37; 369/112; 369/103
(58) Field of Search .................... 369/112, 126, 369/44.23, 44.37, 122, 116, 103, 54, 94, 275.2; 359/296, 223, 629, 574, 634, 576, 577

(56) References Cited

U.S. PATENT DOCUMENTS

| 3,506,334 | 4/1970 | Korpel | 350/160 |
|---|---|---|---|
| 3,597,701 | * 8/1971 | Cornillault | 331/94.5 |
| 3,603,685 | * 9/1971 | Heflinger | 356/109 |
| 4,789,978 | * 12/1988 | Shikama et al. | 369/112 |
| 5,071,253 | 12/1991 | Chase | 359/245 |
| 5,119,454 | * 6/1992 | McMahon | 385/49 |
| 5,587,983 | 12/1996 | Bailey | 369/59 |
| 5,646,920 | 7/1997 | Raczynski | 369/47 |
| 5,883,875 | * 3/1999 | Coufal et al. | 369/116 |

OTHER PUBLICATIONS

H. Kogelnik Theory of Dielectric Waveguides, 1979.

* cited by examiner

*Primary Examiner*—Tan Dinh
*Assistant Examiner*—Kim-Kwok Chu
(74) *Attorney, Agent, or Firm*—Lalos & Keegan; Michael N. Lau

(57) ABSTRACT

A composite interferometer and electro-optical prism provide a means to control the position of a spot of light to read and write data on an optical disc. In this invention each light ray from a spectral source of a cone of light rays is regenerated into a plurality of light rays by an interferometer. These rays are transmitted through an electro-optic crystal and focused by a lens into a constructive interference fringe on an optical disc. A voltage across the electro-optical crystal and magnetic field inside the spectral source define the position of the constructive interference fringe on the disc.

39 Claims, 12 Drawing Sheets

ELECTRONICALLY TRANSLOCATABLE OPTICAL STYLET

This application claims the benefit of Provisional Application Ser. No. 60/053,682 filed on Jul. 24, 1997.

BACKGROUND OF THE INVENTION

1. Field of the Invention

Fields of the inventions are: Data Storage, Compact Disc, and Optical Storage

Fields of search are: 235/375, 462; 250/201.5; 350/166, 355, 356, 375, 381, 383, 385, 386, 387, 388, 392; 359/245, 248, 250, 276, 281; 360/18, 24, 32, 33.1, 39, 72.01, 72.02; 369/44.23, 44.41, 44.42, 44.37, 59, 102, 111, 112, 124, 275.1, 275.3,

2. Description of the Prior Art

Current optical disc data pickup systems employ an electro-mechanical gimbal optical system to track and read the data band spiral. These gimbal systems use a single diode laser. In the more conventional system the laser beam is diffracted into three beams. In this approach the center beam reads the data while the outer beams track the spiral. Tracking errors generated by the tracking beams produce a mechanical torque to swivel the optical system so as to bring the reading beam to the center of the data spiral.

Techniques are also known wherein the light probe employed to track and read the data band spiral is delivered to the surface of the disc by an optical fiber. In this approach the fiber is in a permanent magnet inside an electro-magnet. An electrical current in the electro-magnet causes the permanent magnet to move. This causes the fiber to move thus translating the light probe across the surface of the disc.

Techniques are known whereby a constructive interference fringe can be produced and its position controlled by an electric field:

| 3,506,334 | Apr., 1970 | A. Korpel |
| 5,071,253 | Dec., 1991 | R. Chase |

Techniques are known whereby digital data can be recorded on and read from an optical compact disc:

| 5,587,983 | Dec., 1996 | J. Bailey |
| 5,646,920 | Jul., 1997 | W. Raczynski |

SUMMARY OF THE INVENTION

This invention uses an interferometer in combination with an electro-optic prism to generate an Electronically translocatable Optical Stylet. A converging pencil of light rays is injected into the interferometer where it is regenerated into a plurality of diverging pencils of light rays. These diverging pencils are collected and converged into a constructive interference fringe on the surface of an optical data storage disc. The location of this fringe on the disc is controlled by controlling the wavelength of the light and the voltage applied across the electro-optic prism.

It is the prime objective of this invention to provide a precision electronically controlled spot of light to track and read data from an optical data storage disc.

It is another objective of this invention to provide a precision electronically controlled spot of light to write data on an optical data storage disc.

It is a further objective of this invention to provide precision control of a spot of light that has no moving mechanical components.

It is an additional objective of this invention to provide an optical probe compatible with a multitude of optical data storage disc formats such as the compact disc and the digital viedo disc.

BRIEF DESCRIPTION OF THE DRAWINGS

FIG. 4a shows fringe 500 reconstructed in the center of a pit at band 450a.

FIG. 4b shows fringe 500 reconstructed on the left edge of a pit at band 450a.

FIG. 4c shows fringe 500 reconstructed on the right edge of a pit at band 450a.

DESCRIPTION OF THE PREFERRED EMBODIMENTS

Figure 1:
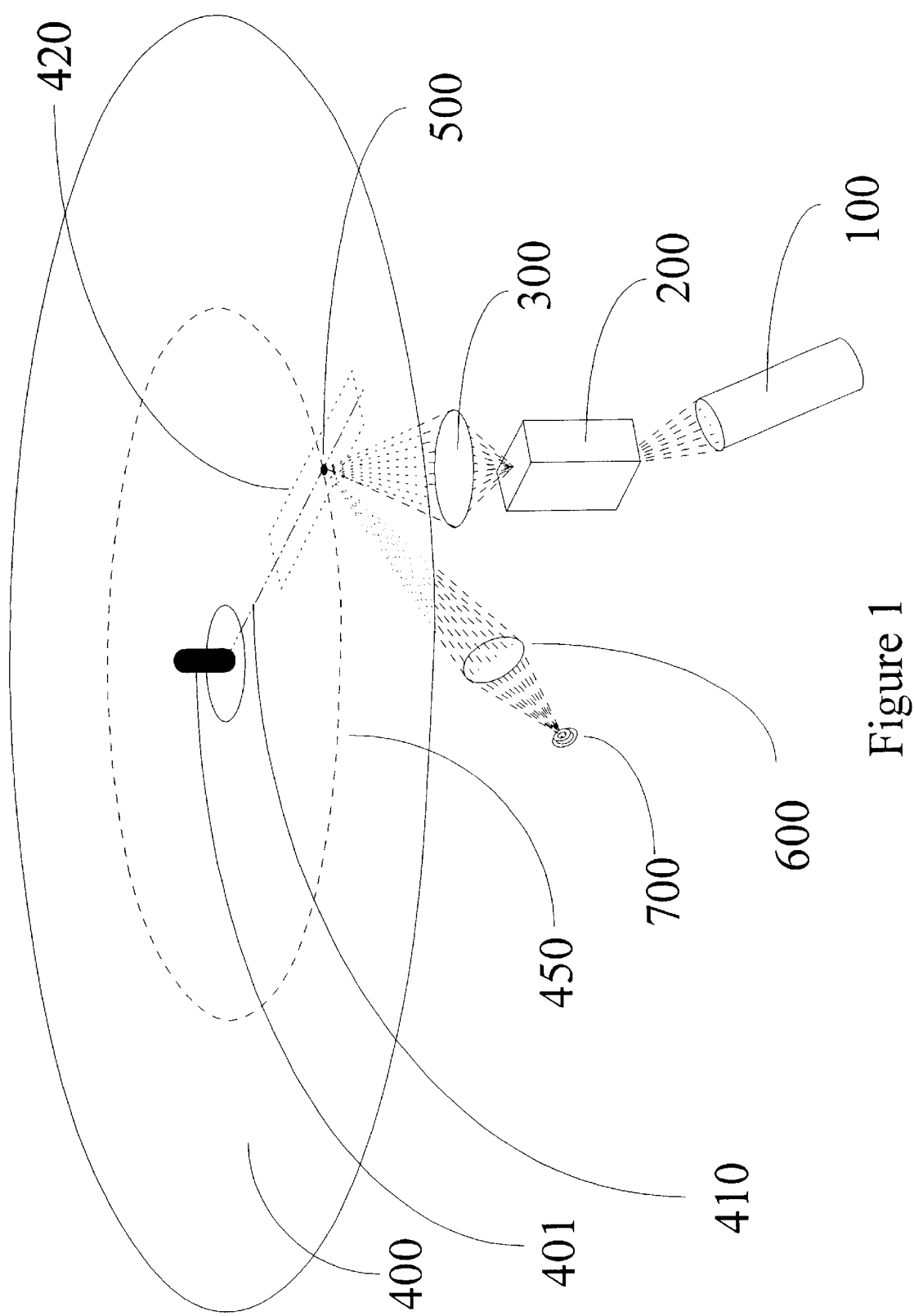
FIG. 1 shows a perspective view of the Electronically Translocatable Optical Stylet produced by a spectral point source generator 100, stylet generator 200, and focusing lens 300 reading and writing data on optical disc 400.

Basic configuration of the Electronically Translocatable Optical Stylet is seen in FIG. 1. Configured herein to the specifications of the Digital Video Disc (DVD) it comprises a point source optical system 100, an stylet generator 200, a converging lens 300 to form constructive interference fringe 500 at data band 450 on optical disc 400. Lens 600 is provided to collect and focus light from data band 450 on photo detector 700. The intersection of the plane of incidence of stylet generator 200 and disc 400 is shown as line 410.

Figure 1A:
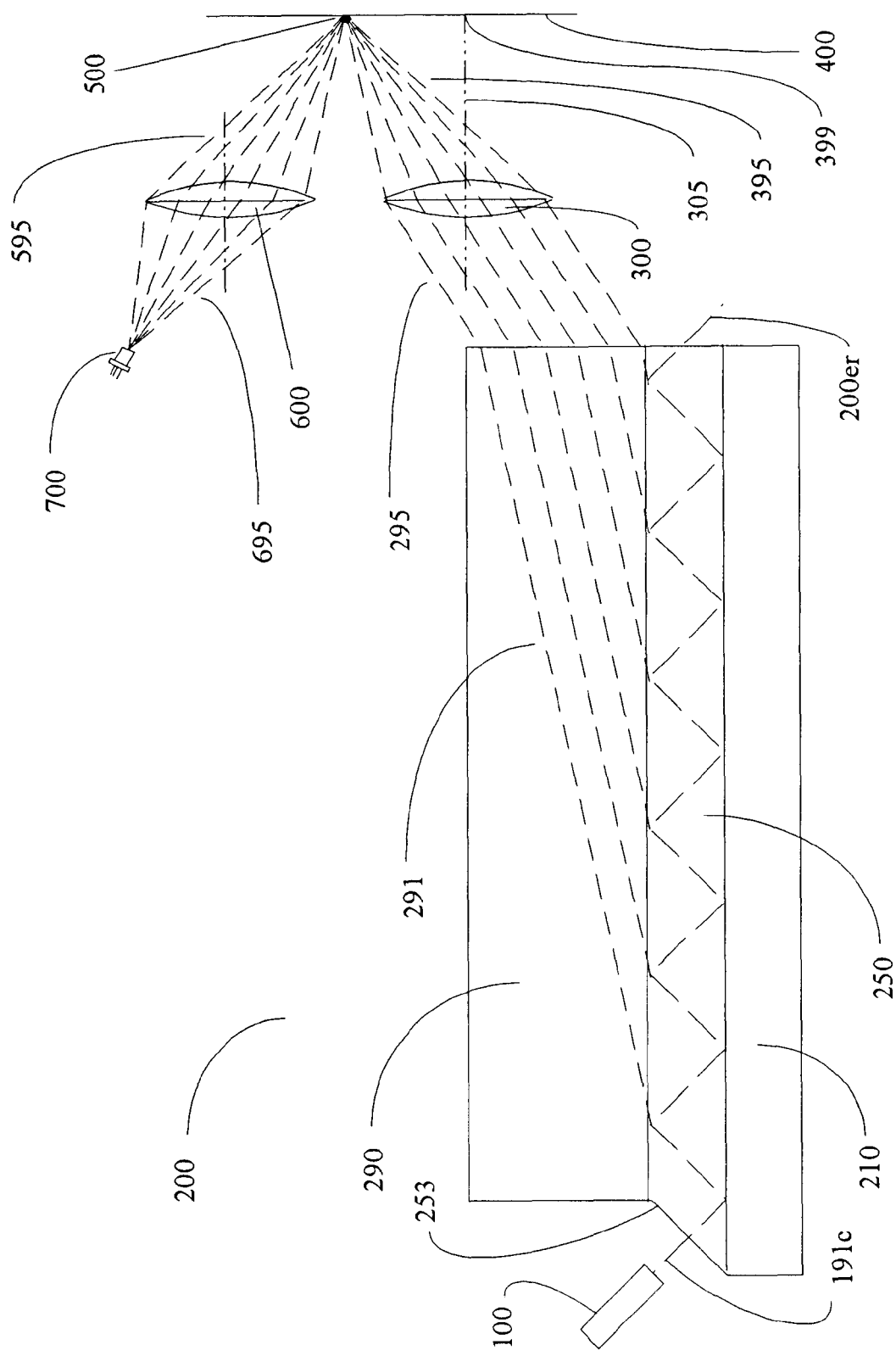
FIG. 1a shows an optical ray trace of FIG. 1.
Figure 1B:
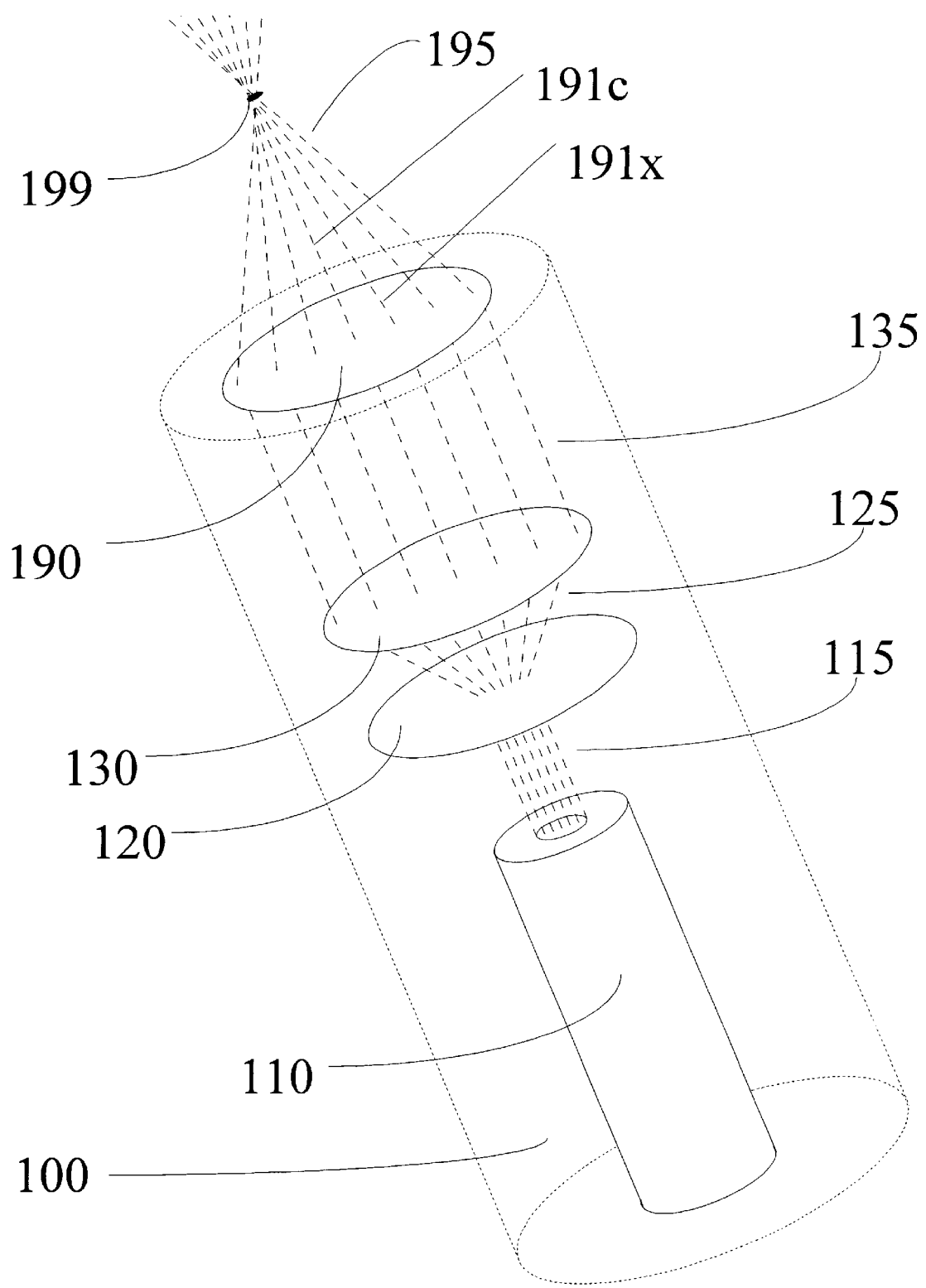
FIG. 1b shows a typical spectral point source generator 10 shown in FIG. 1 employing laser 110.

FIG. 1b shows a typical point source optical system 100 that produces a converging cone of light rays 195. Cone 195 is technically referred to as pencil of light rays 195 or simply "pencil 195" and produces point source 199.

In this embodiment, source 100 employs a Helium-Neon laser spectral source 110 to produce a beam of parallel light rays 115. The wavelength of these rays is 632.8 nanometers. Beam 115 is collected by lens 120 and converted to diverging pencil 125. Pencil 125 is collected by lens 130 and converted to beam 135. Beam 135 is collected by lens 190 and converted to converging pencil 195 that produces point of light 199. The converging input cone angle of pencil 195 as 10.710 milliradians (36'49.1").

In addition, FIG. 1 shows the central ray 191c and an off axis ray 191x of pencil 195.

Figure 2:
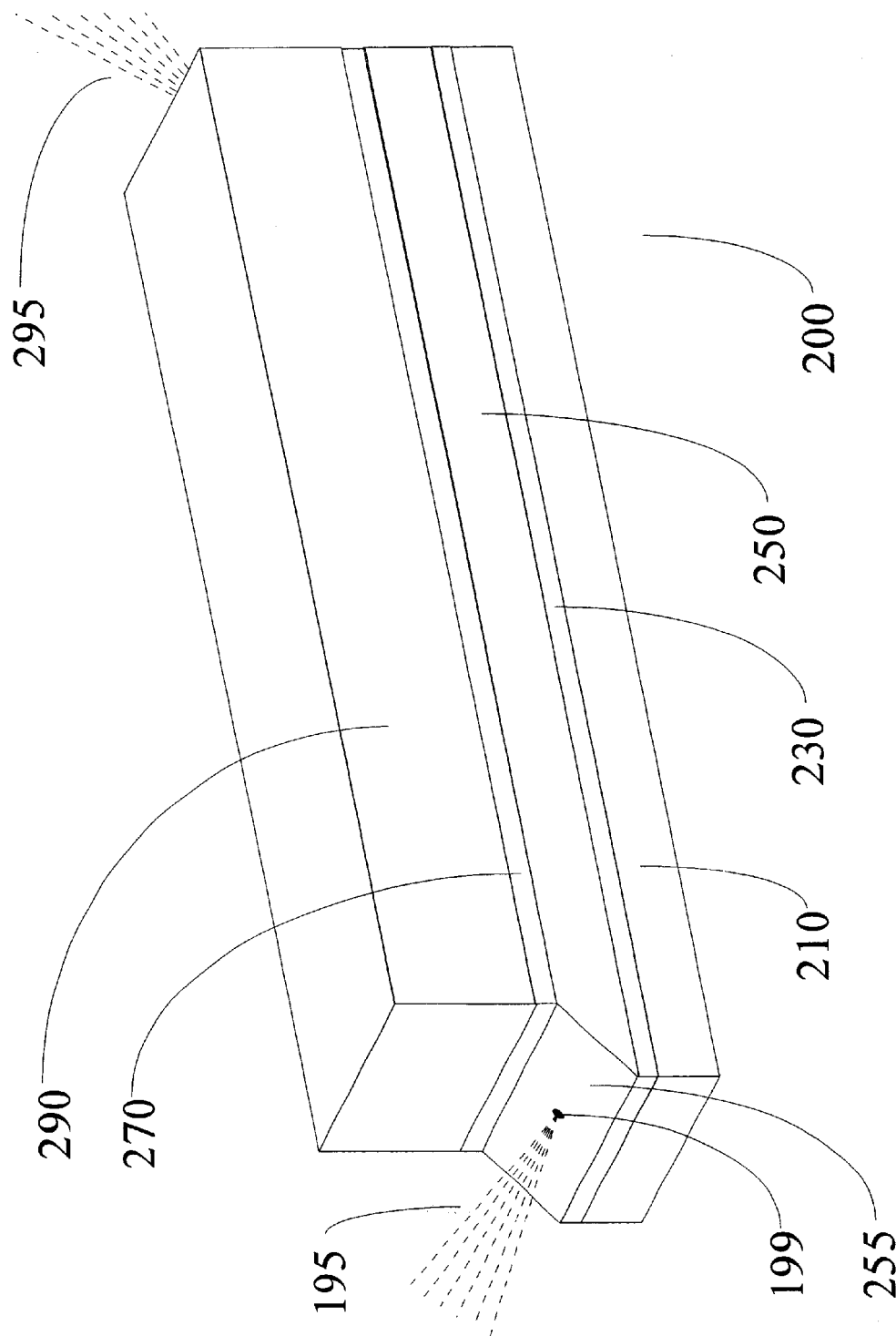
FIG. 2 shows a perspective view of a stylet generator 200 with an input pencil of light rays 195 and an output bundle of light rays 295.

FIG. 2 shows a three dimensional view of style generator 200 that regenerates pencil 195 into a plurality of pencils of rays 295. This plurality of pencils, having transited stylet generator 200, is technically known as bundle 295.

Stylet generator 200 consists of substrate 210, total reflecting film 230, waveguide 250, partially reflecting film 270, and electro-optic cover 290. Pencil 195 is injected into waveguide 250 by locating point 199 at entrance face 253. Pencil 195 is orthogonal to face 253.

Figure 2A:
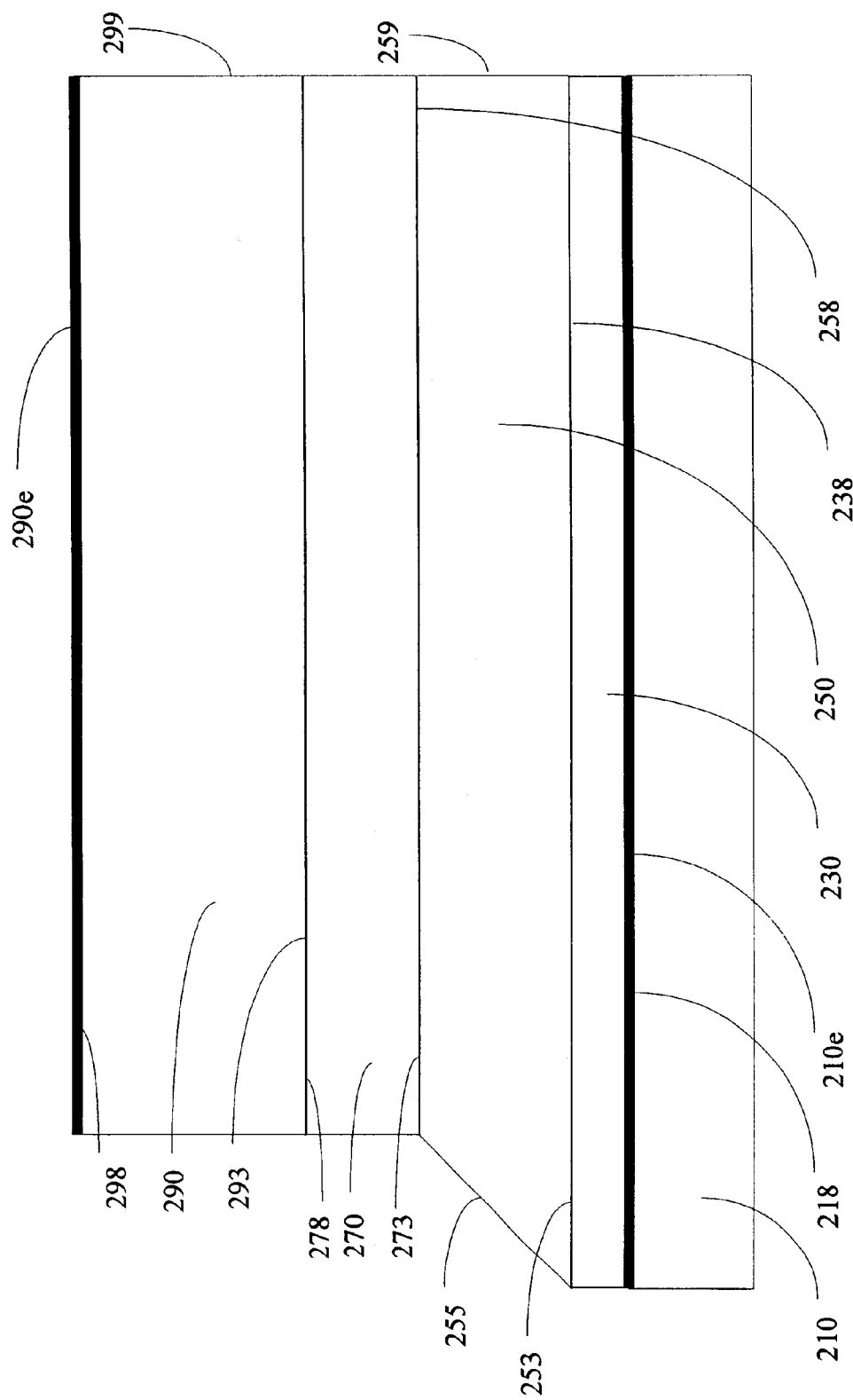
FIG. 2a shows a cross-sectional view of the components of stylet generator 200 shown in FIG. 2 identifying the individual elements.
Figure 2B:
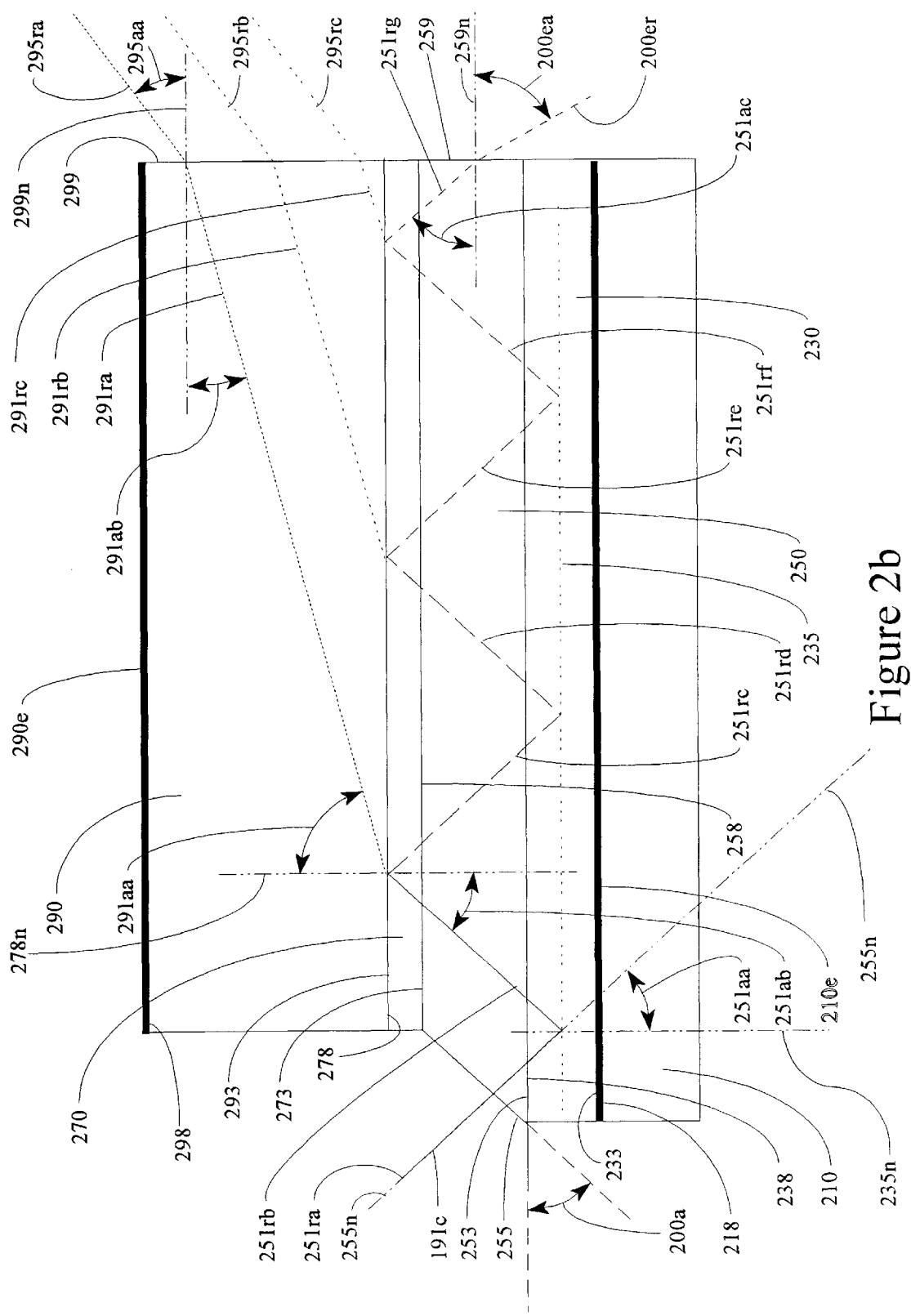
FIG. 2b shows an optical ray trace through stylet generator 200 shown in FIG. 2

A FIG. 2a shows a cross-sectional view of stylet generator 200 in the plane of incidence. Stylet generator 200 consists of a:

1. Substrate 210 is Fused Silica ($SiO_2$) configured as a 4 millimeter wide, 131.1 millimeter long, and 2 millimeter thick parallelopiped.
2. Electrical conductor 210e of Aluminum (Al) is 0.1 nano-meters thick and vapor deposited on face 218 of Substrate 210, a
3. Total reflection film 230 of Magnesium Fluoride ($MgF_2$) whose index of refraction is 1.38. Film 230 is a 2.000 micrometers thick and vapor deposited on Electrical Conductor 210e, a
4. Waveguide 250 is a Zinc Selinide (ZnSe) crystal whose index of refraction is 2.5918. Waveguide 250 is configured as a chisel shaped prism with two sets of opposing parallel faces. Face 258 is the obverse face 4 millimeters wide by 131 millimeters long. It is parallel to face 253, the reverse face, which is 4 millimeters wide by 131.1 milli-meters long. Both face 253 and face 258 are optically flat to $\lambda/20$. The spacing between face 253 and face 258 is 519.958 micrometers. In FIG. 2b face 255 is beveled so as to make angle 200a, with respect to face 253, equal to 608.313 milliradians (34°51'13.5"). This face is optically flat to $\lambda/20$. Beveled face 255 is the waveguide entrance face. Face 258 is the waveguide exit face. Face 253 is the total reflection face and is in optical contact with film 230, a
5. Partial reflection film 270 is Magnesium Fluoride ($MgF_2$) whose index is 1.38. Film 270 is 527.2 nanometers thick. It is vapor deposited on face 258 of waveguide 250. This controls the amount of energy in any incident ray that leaks into cover 290 at each reflection, a
6. Cover 290 is Potassium di-Hydrogen-Deuterium Phosphate (KD*P), an electro-optical material, whose index of refraction is 1.502. In addition KD*P has a dielectric constant of 44.5 mm/mm and an electro-optic coefficient of $3.22 \times 10^{-8}$ mm/volt. Cover 290 is configured as a parallelopiped 4 millimeters wide by 30 millimeters long and 5.049 millimeters thick. Face 293 is the entrance face. Face 299 is the exit face. Face 293 is orthogonal to exit Face 299. Face 293 and face 299 are optically flat to $\lambda/20$. Face 293 is in optical contact with Film 270.
7. Electrical conductor 290e is Aluminum (Al) 0.100 nanometers thick. It is vapor deposited on face 298 of cover 290.

FIG. 2b shows the basic interferometric process in stylet generator 200 by the action of the first three reflections of a ray inside waveguide 250. This ray trace employs the following terms:

1. Entrance face of waveguide 250 is face 255,
2. Normal to entrance face 255 is normal 255n,
3. Interface between waveguide 250 and film 230 are faces 238 and 253,
4. Normal to face 235 is normal 235n,
5. Interface between waveguide 250 and film 270 are faces 258 and 273,
6. Interface between film 270 and cover 290 are faces 278 and 293,
7. Normal to face 278 is normal 278n,
8. Normal to exit face 299 is normal 299n,
9. The Goos-Hänchen total reflection boundary is shown as line 235.

With no electric field between film 210e and film 290e the ray trace proceeds as follows:

1. Ray 191c is incident normal to face 255.
2. Ray 191c enters waveguide 250 to become ray 251ra.
3. Ray 251ra transits waveguide 250 and is incident on face 253 at angle 251aa with respect to normal 235n generating an evanescent wave inside film 230. Angle 251aa is −608.313 milliradian (−34°51'13.5"). (Note: a negative sign denotes counter-clockwise rotation)
4. Ray 251ra penetrates Film 230, in accordance with the Goos-Hänchen Shift [see Kogelnik, H., "Goos-Hänchen Shift" Topics in Applied Physics Vol. 7 Integrated Optics 25, Springer-Verlag, Berlin, Germany (1979)], to boundary 235, at a depth of 187.192 nanometers where it is totally reflected back into waveguide 250 as ray 251rb.
5. Ray 251rb transits Waveguide 250 and is incident on face 258 at angle 251ab. (Note: angle 251ab equals angle 251aa) Here it generates an evanescent wave that penetrates film 270. When this evanescent wave reaches face 278, 0.5% of the energy in ray 251rb is transmitted into cover 290 as ray 291ra and 99.5% is reflected back into waveguide 250 as ray 251rc at angle 251ab. Angle 291aa, between ray 291ar and normal 278n, is 1.404065 radians (80°26'49.2").
6. Ray 251rc transits waveguide 250 and is incident on film 230 at face 253 where it again generates an evanescent wave that penetrates film 230 to boundary 235 to be totally reflected back into waveguide 250 as ray 251rd.
7. Ray 251rd transits waveguide 250 and is incident on Face 258 where it generates an evanescent wave that penetrates film 270. When this evanescent wave reaches face 278, 0.5% of the energy in ray 251rd is transmitted into cover 290 as ray 291rb and 99.5% is reflected back into waveguide 250 as ray 251re. The energy in ray 291rb is 0.4975% of the energy in ray 251ra and the energy in ray 251re is 99.0025% of the energy in ray 251ra. Thus 0.9975% of the energy in ray 251ra is in ray 291ra and ray 291rb.
8. Ray 251re transits waveguide 250 and is incident on film 230 at face 253 where it generates an evanescent wave that penetrates film 230 to boundary 235 to be totally reflected back into waveguide 250 as ray 251rf.
9. Ray 251rf transits waveguide 250 and is incident on Face 258 where it generates an evanescent wave that penetrates Film 270. When this evanescent wave reaches face 278, 0.5% of the energy in ray 251rf is transmitted into cover 290 as ray 291rc and 99.5% is reflected back into waveguide 250 as ray 251rg. The energy in ray 291rc is about 0.495% of the energy in ray 251ra and the energy in ray 251rg 99.025% of the energy in ray 251ra. Thus about 0.975% of the energy in ray 251ra is in rays 291ra, 291rb, and 291rc.
10. Rays 291ra, 291rb, and 291rc transit cover 290 and are incident on Face 299. The angle between rays 291*ra*, 291*rb,* and 291*rc* and normal 299*n* is 291*ab* which is 166.731 milliradians (9°33'10.8").

11. Rays 291*ra*, 291*rb,* and 291*rc* exit face 299 to become rays 295*ra*, 295*rb,* and 295*rc*. The angle 295*aa* between ray 295*ra* and normal 299*n* is 251.928 milliradians (14°26'3.9").

12. Rays 291*ra*, 291*rb,* and 291*rc* are the first three of a sequence of 41 parallel phased related geometrically degraded amplitude rays regenerated from ray 191*c*. This sequence is only one of a plurality of sequences of rays that constitute bundle 295. The optical path difference between sequential rays is 2.2148 micrometers. This is 3500 times the wavelength of the rays and is called the order number.

Figure 3:
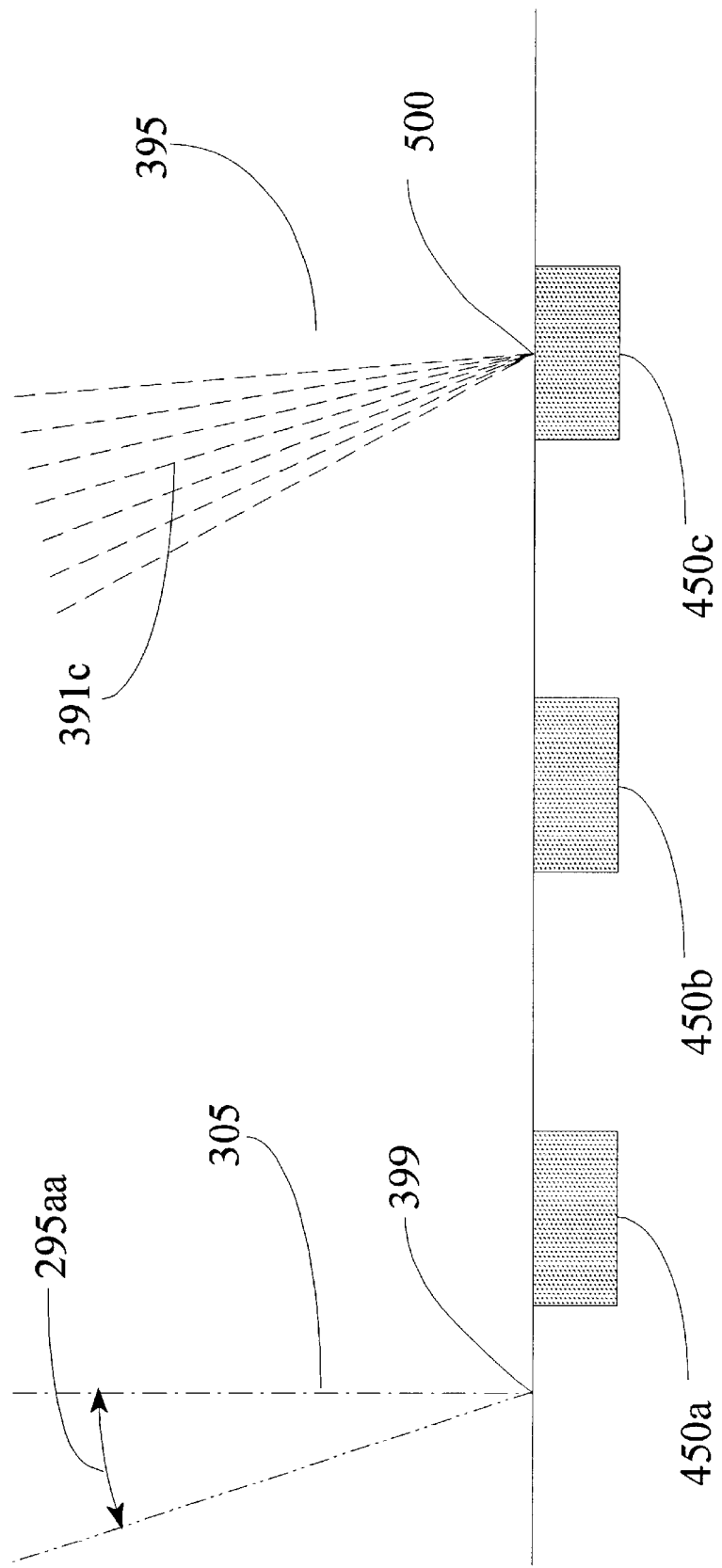
FIG. 3 is a cross-sectional view of disc 400 at radii 410 showing data bands 450a, 450b, 450c.
Figure 4:
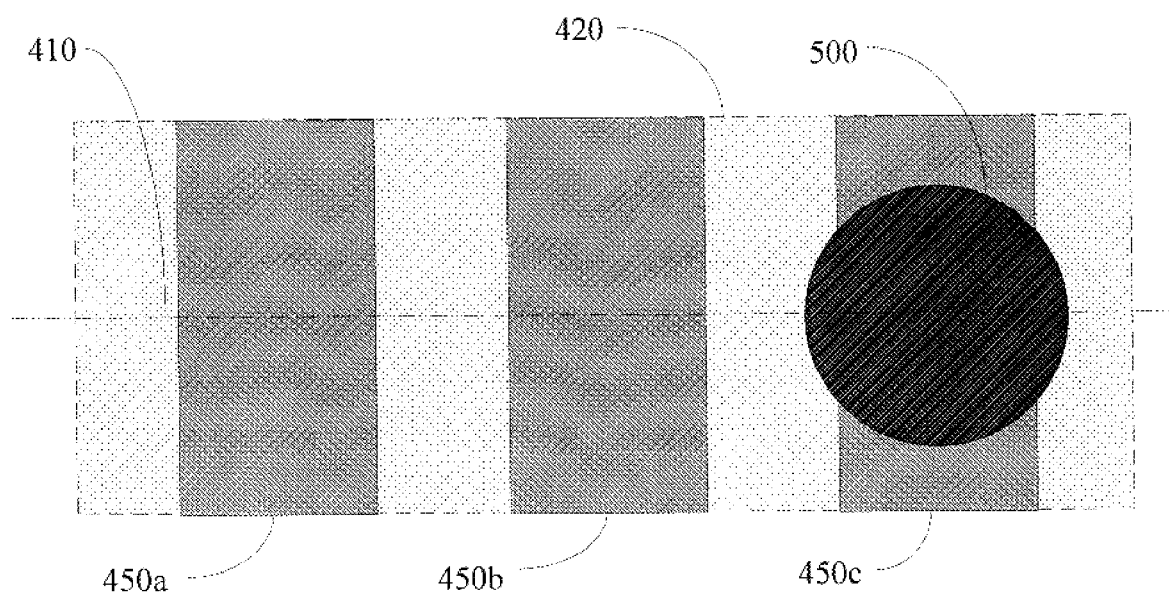
FIG. 4 shows fringe 500 reconstructed in the center of a pit at band 450c.
Figure 4A:
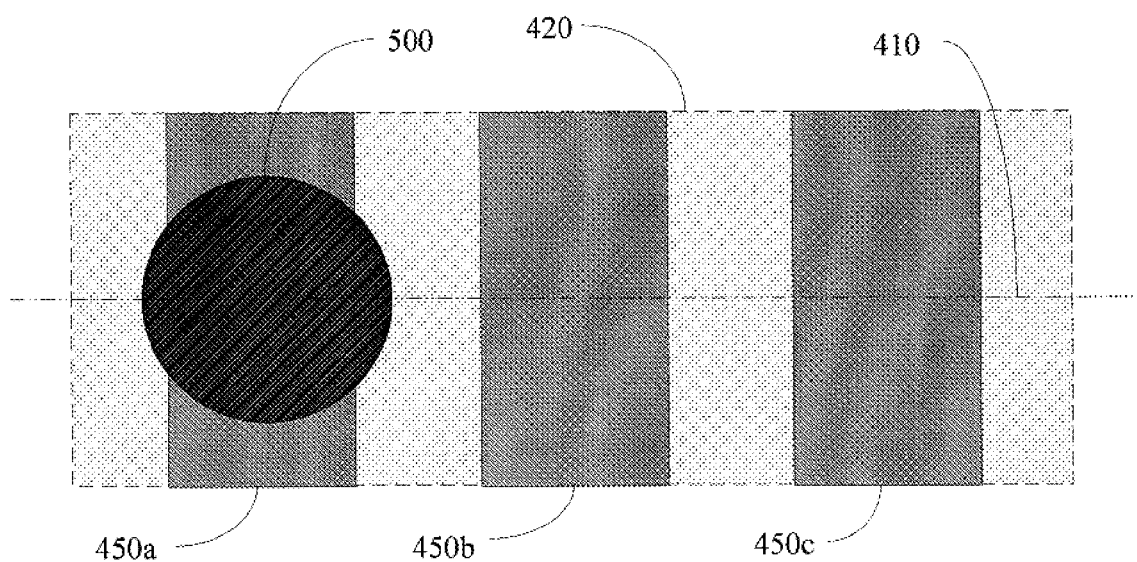
Figure 4B:
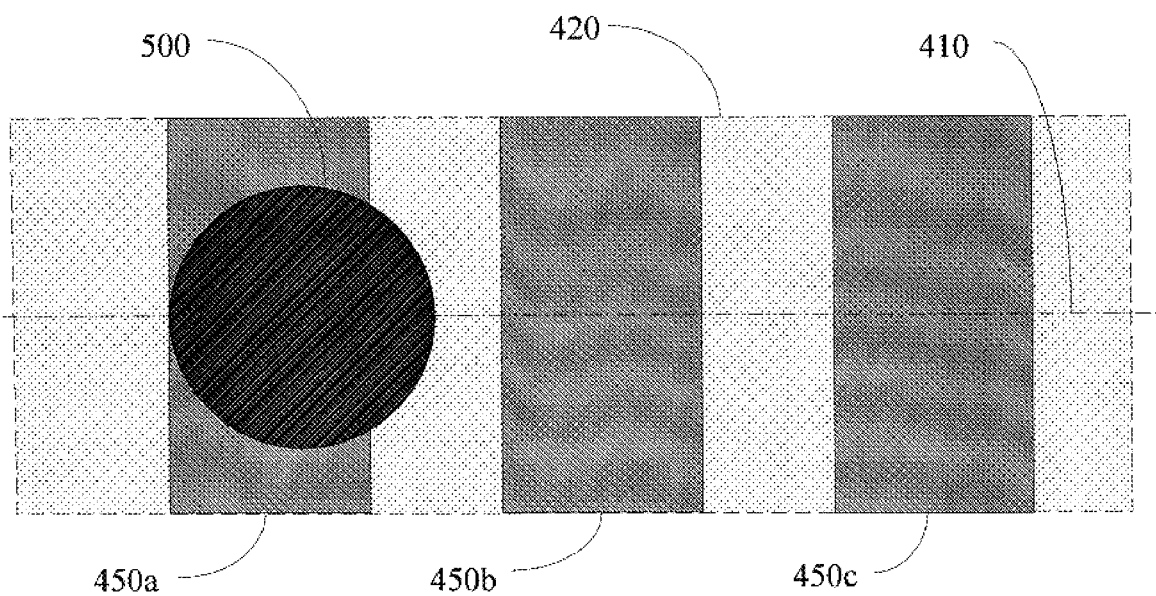
Figure 4C:
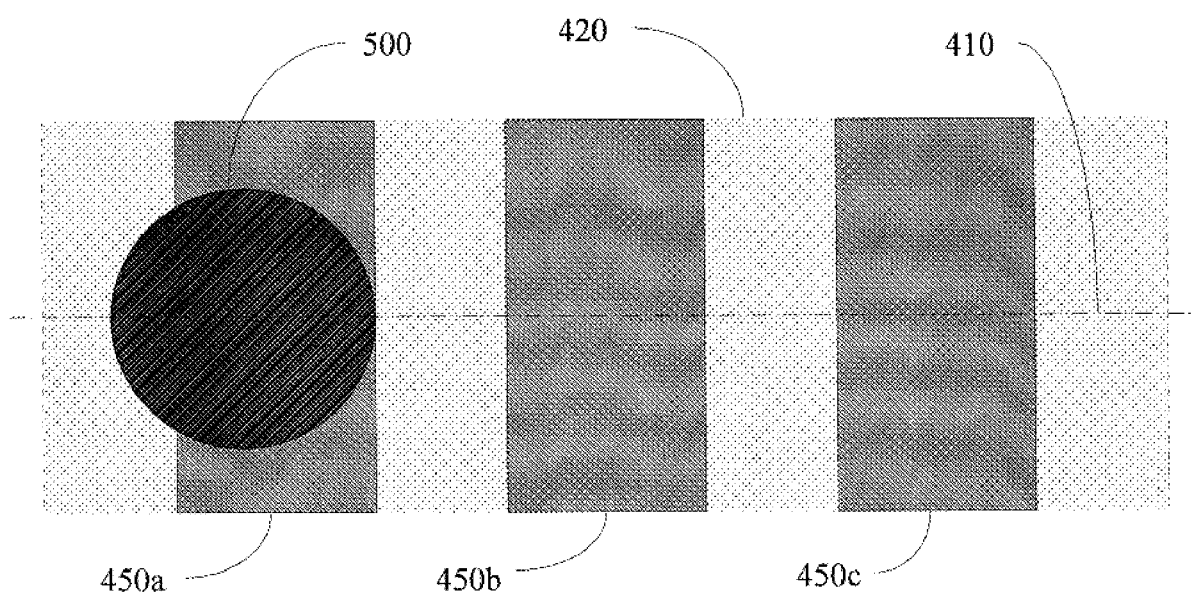

FIG. 1*a* is an optical ray trace of FIG. 1 showing bundle 295 being collected by lens 300 and converted into converging pencil 395 to form constructive interference fringe 500 on disc 400. FIG. 3 shows a crossectional view of area 420 from disc 400 wherein pencil 395 is incident on data band 450*c*. Also see FIG. 4 showing fringe 500 overlapping band 450*c*. Optical axis 305, of lens 300, orthogonal to both face 299 and disc 400.

Lens 300, Numerical Aperture NA 0.698, produces fringe 500 as a 406 nanometers diameter constructive interference fringe. Rays reflected from fringe 500 diverge as pencil 595 and are collected by lens 600 which converges them as pencil 695 onto photo diode 700.

In FIG. 3, fringe 500 is displaced from focal point 399. This displacement lies in the plane of incidence. The magnitude is defined by the following factors:

1. thickness of waveguide 250,
2. angles of rays entering waveguide 250,
3. index of refraction of waveguide 250,
4. index of refraction of cover 290,
5. focal length of lens 300, and
6. wavelength of ray 191*c*.

Thus the magnitude of the displacement, or location, of fringe 500 from point 399 can be changed by changing any of these parameters. In this embodiment both the index of refraction of cover 290 and the wavelength of the rays are controlled to control the location of fringe 500.

For this configuration with zero voltage between electrical conductors 210*e* and 290*e* the displacement of fringe 500 from point 399 is 900.888 micrometers.

When the electric potential between conductors 210*e* and 290*e* is 3.687 kilovolts the index of refraction of cover 290 decreases to 1.50196 causing angle 291*aa* to increase to 1.404223 radians (80°27'21.8"). Angle 291*ab* now decrease to −166.573 milliradians (−9°22'38.2") causing angle 295*aa* to decrease to −251.687 milliradians (−14°25'14.1") which results in the distance between fringe 500 and point 399 becoming 899.988 micrometers.

In this manner an increase in the electrical potential between conductors 210*e* and 290*e*of 3.687 kilovolts has caused a decrease in the distance between fringe 500 and point 399 of 900 nanometers.

Figure 1C:
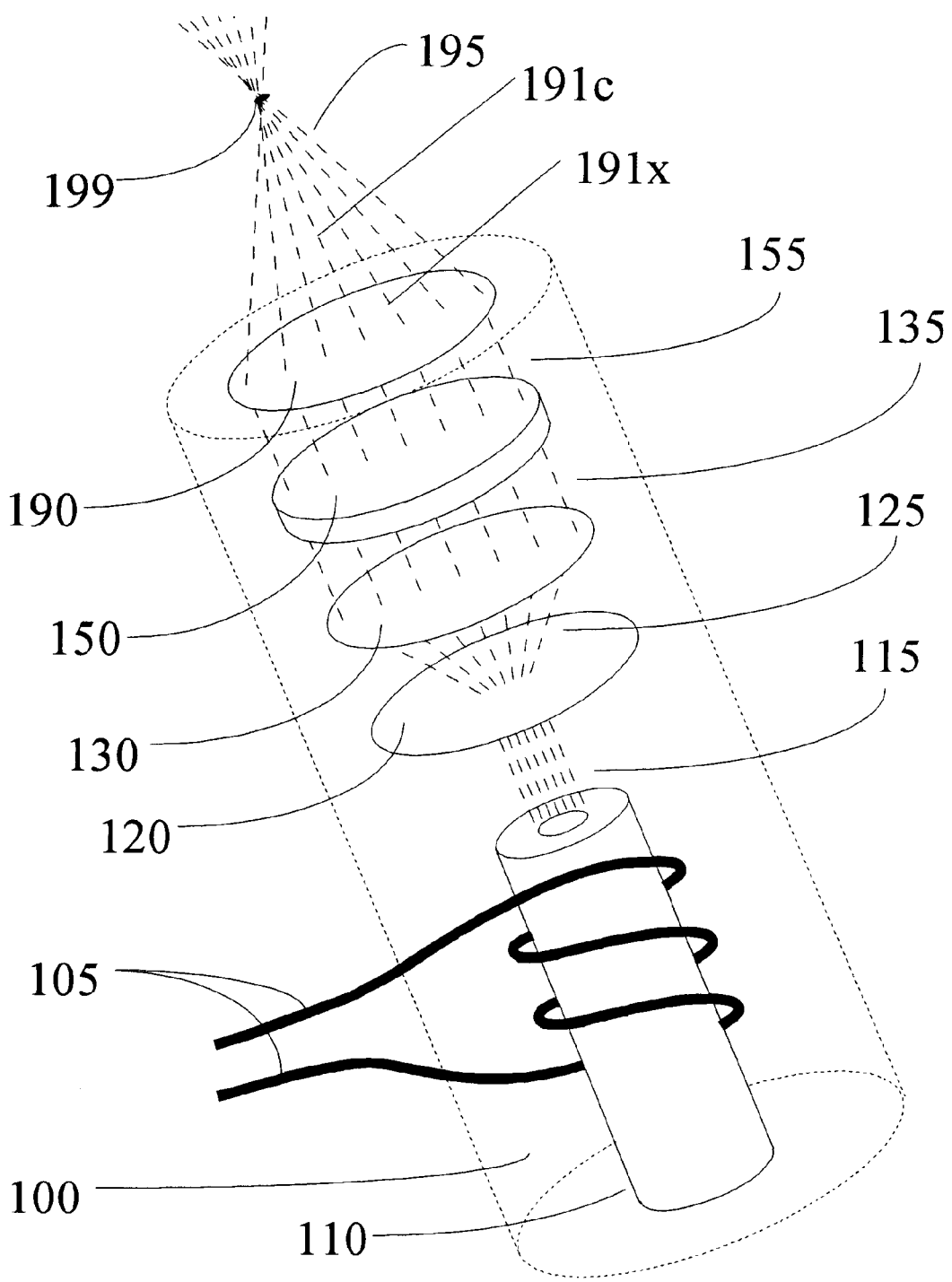
FIG. 1c shows the point source of FIG. 1b with an electrical coil 105 encircling laser 110.

Alternately when the voltage between conductors 210*e* and 290*e* is zero and a 4.3566 kilogauss magnetic field is impressed on source 110 by an electric current in coil 105, see FIG. 1*c*, the emitted radiation is split into two wavelengths. One wavelength is 632.792 nanometers and is right circularly polarized while the other is 632.808 nanometers and is left circularly polarized. FIG. 1*c* shows quarter wave plate 150 that serves to convert circularly polarized light into linearly polarized light. Plate 150 is oriented so that the 632.792 nanometer radiation is in the plane of incidence of interferometer 200 and the 632.808 nanometer is orthogonal to it.

Input ray 191*x* whose wavelength is 632.792 nanometers incidence on face 255 at an angle of −47.879 microradians (−9.9") to emerge inside the waveguide at an angle −18.473 microradians (−3.84"). Ray 191*x* is incidence on face 278 at an angle of 608.331 milliradians (35°1'48.3") so as to exit face 293 at an angle of 1.404223 radians (80°27'21.8"). Ray 191*x* is in turn incidence of face 299 at an angle of 166.573 milliradians (9°32'38.2"). Thus exiting cover 290 at an angle of −251.687 milliradians (−14°25'14.1"). This causes ray 191*x* to be regenerated as constructive interference fringe 500 at data band 450*c* which is 988.988 micrometers from point 399. This is the same distance achieved by applying 3.687 kilovolts in the previous case.

Those rays whose wavelength is 632.808 nanometers are polarized orthogonal to the plane of incidence causing all of the energy in ray 251*rb* to be reflected back into waveguide 250 at face 258. Thus none of the energy of the 632.808 nanometer radiation leaks into cover 290.

A hybrid integration of the preceding electrical and magnetic techniques for changing the position of fringe 500 would employ a 2.1788 kilogauss magnetic field on source 110 and a 1.8439 kilovolt eletric field between conductors 210*e* and 290*e*. In this approach the wavelength of ray 191*x* is 632.796 nanometers and enter waveguide 250 at an angle of −24.0 nanoradians (−4.9"). Ray 191*x* is then incident on face 253 at an angle of −608.322 milliradians (−35°1'45.6") so as to enter cover 290 at an angle of 1.404144 radians (80°27'5.5"). Ray 191*x* is then incident on face 299 at an angle of −166.652 milliradians (−9°32'54.5") and exits cover 290 at an angle of −251.807 milliradians (−14°25'39.0"). As before this causes ray 191*x* to be regenerated as constructive interference fringe 500 at data band 450*c* which is 988.988 micrometers from point 399.

The center of fringe 500 can now be moved±150 nanometers, from the center to the right or left side of data band 450*a*, by changing the voltage from 1.8439 kilovolts to 1.22294 kilovolts. This is ±614.5 volts oscillation about a bias of 1.8439 kilovolts. Alternately the magnetic field can changed from 1.4525 kilogauss to 2.9048 kilogauss. This would be a ±726.1 gauss oscillation about an initial 2.1788 kilogauss field.

Changing the wavelength of the input rays can be accomplished by using either of two optical phenomenon, the Stark Effect or the Zeeman Effect. Both are well documented concepts wherein an electric field (Stark effect) or a magnetic field (Zeeman effect) inside a spectral source changes the energy level (wavelength) of the emitted radiation. Employing either of these effect permits electronically tuning the wavelength of the rays of pencil 195 and thus electronically relocating fringe 500.

The operational Electronically Translocatable Optical Stylet is configured with the plane of incidence of interferometer 200 passing through axis 401 and intercepting disc 400 along radii 410. Interferometer 200 exit Face 299 normal 299*n* is perpendicular to disc 400. The angle between lens 300 axis 305 and interferometer 200 normal 295*n* is −251.687 radians (−14°25'14.1"). Lens 300 has a 3.5 millimeter focal length at FN f/0.716 (NA 0.698 Numerical Aperture) with focal point 399 located at the surface of disc 400. Spectral source 110 is a Helium-Neon laser whose wavelength is 632.8 nanometers so that the order number of sequential rays in beam 395 is 3500 waves.

FIG. 3 is a cross-sectional view of disc 400 along radii 410 showing data bands 450*a*, 450*b,* and 450*c*. In this Electronically Translocatable Optical Stylet system the "center-to-center" spacing of these data bands is 740 nanometers, which is the same as the commercial Digital Video Disc. Shown here are optical axis 305, point 399 at angle 295aa which is now the angle of the central ray of pencil 395. Point 399 is located at data band 450a. The distance between point 399 and fringe 500 is 1.48 micrometers which is twice the pitch of the data band spiral. Thus fringe 500 has being constructed at band 450c, see FIG. 4. Band 450c is now considered to be the fiducial band.

The Electronically Translocatable Optical Stylet can be employed in either of three operational modes. One is a relatively inexpensive single fringe system which is less accurate and but well suited to the audio and subprofessional personal computer markets. A more accurate and expensive system for the professional audio engineer and general personal computer market would employ two fringes. The most expensive system having the highest data capacity and ultimate performance capability employs three fringes.

In the first, or single fringe mode, the fringe tracks the data band spiral and reads the data. This single fringe device can also inscribe data in the disc's virgin surface.

The basic procedure involves oscillating fringe 500 over the pits of band 450a. Fringe oscillations generate an error voltage in the electronics. This error voltage is used to change either the electric field across cover 290 or the magnetic field impressed on source 110. Thus should fringe 500 drift off band 450a the electronics would sense the error, analyze the output signal and calculate the magnitude and direction of the misalignment between the centers of the pit and fringe. The electronics would, within the time constant of the circuit, change either the electric or magnetic fields to cause fringe 500 to be centered on band 450a thus tracking the band. Data carried on the band would be extracted from the electronic signal by analyzing the presents or absence of an error voltage.

The single fringe mode can both track and read data as well as inscribe data on the virgin surface of an optical disc. This is accomplished by applying a bias voltage across films 210e and 290e so as to locate fringe 500 on a data band 450a that has data inscribed thereon. The Electronically Translocatable Optical Stylet tracks this band during the time no pit is being inscribed in the virgin surface. During the time a pit is being inscribed the voltage across films 210e and 290e is changed to relocate fringe 500 to virgin band 450b where the appropriate pits are "burnt in". After one revolution of the disc this newly inscribed band 450b becomes band 450a being tracked by fringe 500.

In the second, or dual fringe mode, one fringe tracks the data band spiral and reads the data while the second fringe inscribe data in the disc's virgin surface thus creating a new band spiral.

In this mode the first fringe, is the tracking fringe, while the second fringe, is the stylet fringe. In this mode a bias voltage is applied across films 210e and 290e so as to position both tracking fringes over band 450a. A magnetic field is applied to one of the sources in order to change the wavelength thus causing the stylus fringe to be positioned over band 450b.

As before the tracking procedure involves employing an oscillating voltage across films 210e and 290e to oscillate tracking fringe over the pits in band 450a. This generates an error voltage that is used to change the bias electric field across films 210e and 290e.

Thus should the tracking fringe 500t "drift off" band 450a the electronics would sense the error, analyze the output signal and calculate the magnitude and direction of the misalignment between the centers of the pit and the tracking fringe. The electronics would, within the time constant of the circuit, change the electric field bias to cause the tracking fringe to track band 450a and the stylus fringe to overlay virgin band 450b.

The stylus fringe would now inscribe the appropriate pits in the virgin band 450b.

Data carried on the band would be extracted from the electronic signal by analyzing the presents or absence of an error voltage.

In the third, or triple fringe mode, two fringes track and read the data band spiral. The third fringe inscribes "pits" in the disc's virgin surface.

In this mode the first two, fringes are tracking fringes, while the second, fringe is the fringe. In this mode a bias voltage is applied across films 210e and 290e so as to position all three fringes over band 450a. A magnetic field is applied to one of the sources in order to change its wavelength and causing fringe 500s to be positioned over band 450b.

As before the tracking procedure involves employing an oscillating voltage across films 210e and 290e to oscillate tracking fringes over the pits in band 450a. This generates an error voltage that is used to change the bias electric field across films 210e and 290e.

Thus should the tracking fringe drift off band 450a the electronics would sense the error, analyze the output signal and calculate the magnitude and direction of the misalignment between the centers of the pit and the center of the tracking fringes. The electronics would, within the time constant of the circuit, change the electric field to cause both tracking fringes to track band 450a and the stylus fringe to overlay virgin band 450b.

The stylus fringe would now inscribe the appropriate pits in the virgin band 450b.

Data carried on the band would be extracted from the electronic signal by analyzing the presents or absence of an error voltage.

To make the Electronically Translocatable Optical Stylet totally compatible with all of the current CD and DVD systems it is only necessary to make two simple adjustments in the electronic system. These are the:

1. bias voltage and 2. modulation voltage and/or magnetic field

Since stylet generator 200 is a hybrid Lummer-Gehrke Interferometer and an electro-optic cell it does not require a coherent light source and can be adapted to any spectral source and is thus capable of multiple spectral operations.

Further, since the Lummer-Gehrke Interferometer was originally created to study the ultra-violet region of the optical spectrum it is ideally suited for use with non-coherent ultra-violet light, such as 253.7 nanometer. A preliminary analysis shows that a 12 centimeter disc would be capable of storing well over 100 GB of data.

The following is a sequence of computation that exhibit how the Electronically Translocatable Optical Stylet is designed. They further show the effect on the position of the interference fringe due to different voltages across the electro-optic Cover and different magnetic fields inside the spectral source.

ETOS CD-ROM/R

This program designs and analysizes a CD-DVD compatable ETOS reader & writer.

Physical Constants

| | |
|---|---|
| C = speed of light (microns/second) | $C = 3 \cdot 10^{14}$ |
| $n_e$ = environment external index of the cdxtl | $n_e = 1.0$ |
| $n_c$ = index of the Cover (KD*P) | $n_c = 1.502$ |
| $n_o$ = orthnogal index of the Cover (KD*P) | $n_o = 1.502$ |
| $n_g$ = index of the Waveguide (ZnSe) | $n_g = 2.5918$ |
| $n_r$ = index of the Reflection Control Film (MgF$_2$) | $n_r = 1.38$ |
| $n_S$ = index of the Substrate (SiO$_2$) | $n_S = 1.45845$ |
| $\lambda S$ = waveglength of the source (HeNe laser) (microns) | $\lambda S = .6328$ |
| $\nu S$ = frequency of the source (HeNe laser) (hertz)    $Vs = \frac{C}{\lambda S}$ | $\nu S = 4.741 \cdot 10^{14}$ |
| r = electro-optic coefficient (mm/volts) | $r = 3.22 \cdot 10^{-8}$ |
| $\epsilon$ = dielectric constant | $\epsilon = 44.5$ |
| Zk = Zeeman constant | $Zk = 7.142857 \cdot 10^{-7}$ |

System Parameters

| | |
|---|---|
| $\beta$ = bevel angle of the Entrance Face (radians) | $\beta$ is TBD |
| $\xi$ = angle of the ray entering the Waveguide (radians) | $\xi$ is TBD |
| $\Phi$ = angle of the ray inside the Waveguide (radians) | $\Phi$ is TBD |
| $\Theta$ = specified angle of the ray inside the Cover (radians) | $\Phi$ is TBD |
| $\phi$ = angle of the ray at the before exiting the Cover (radians) | $\phi$ is TBD |
| $\zeta$ = angle of the ray exiting the Cover (radians) | $\zeta$ is TBD |
| L = length of the Waveguide (millimeters) | L := 30 |
| Tc = thickness of the Cover (millimeters) | Tc is TBD |
| Tg = thickness of the Waveguide (microns) | Tg is TBD |
| Teff = effective thickness of the Waveguide (microns) | Teff is TBD |
| Tr = thickness of the Reflection Control Film (microns) | Tr := 0.5272 |
| Ts = thickness of the Substrate (millimeters) | Ts := 2 |
| R = reflection coefficient of the Reflection Control Film | R is TBD |
| W = width of the Waveguide (mm): | W := 4.0 |
| fl = focal length of the lens (millimeters) | fl := 3.5 |
| Tp = data track pitch (millimeters) | Tp := 0.00045 |
| dp = diameter of the pit (millimeters)    $dp := \frac{2 \cdot Tp}{3}$ | dp = 0.0003 |

$$\Phi max := \frac{floor\left(1 \cdot 10^7 \cdot asin\left(\frac{n_c}{n_g}\right)\right)}{1 \cdot 10^7}$$

$\Phi max = 0.61814$ $$\Theta max := asin\left(\frac{n_g \cdot sin(\Phi max)}{n_c}\right)$$

$\Theta max = 1.570627$ $$\phi max := \frac{\pi}{2} - \Theta max$$

$\phi max = 0.000169$ $$\zeta max := asin\left(\frac{n_o \cdot cos(\Theta max)}{n_e}\right)$$

$\zeta max = 0.000254$

Dmax := fl · tan($\zeta$max)    Dmax = 0.000888
Dmax := fl · tan($\zeta$max)    Dmax = 0.000888
DRF := Dmax + 2000 · Tp    DRF = 0.900888

$$\zeta RF := atan\left(\frac{DRF}{fl}\right)$$

$\zeta RF = 0.251928$ $$\phi RF := asin\left(\frac{n_e \cdot sin(\zeta RF)}{n_o}\right)$$

$\phi RF = 0.166731168$ $$\Theta RF := \frac{\pi}{2} - \phi RF$$

$\Theta RF = 1.404065158$ $$\Phi RF := asin\left(\frac{n_c \cdot sin(\Theta RF)}{n_g}\right)$$

$\Phi RF = 0.608312571$

-continued $$\text{tom} := \frac{\lambda S}{2 \cdot n_g \cdot \cos(\Phi RF)} \qquad \text{tom} = 0.148763477$$

$\Psi RF := 3500$
$\text{Teff} := \Psi RF \cdot \text{tom}$  \qquad  Teff = 520.672
$Tc := L \cdot \cot(\Theta RF)$ \qquad Tc = 5.049
$tc := Tc \cdot \cos(\zeta RF)$ \qquad tc = 4.889

$$FN := \frac{fl}{tc} \qquad FN = 0.715829$$

$$NA := \frac{0.5}{FN} \qquad NA = 0.698491$$

Depth of Ray Peneration into the Reflecting Film (Goos-Hanchen Effect)

$$dr := \frac{\lambda S}{2 \cdot \pi \cdot \sqrt{(n_g \cdot \sin(\Phi RF))^2 - n_r^2}} \qquad dr = 0.187192$$

$Tg := \text{Teff} - dr - Tr \qquad Tg = 519.9578$

Distance Between Sequential Rays Exiting the Waveguide (Goos-Hanchen Effect)

$$ds := \frac{\text{Teff} \cdot \tan(\Phi RF)}{1000} \qquad ds = 0.3262601$$

Number of Rays in the Array $$p := \text{floor}\left(\frac{L}{2 \cdot ds}\right) \qquad p = 41$$

Frustrated Total Internal Reflection Constants $a := n_g \cdot \cos(\Phi RF) \qquad a = 2.127$ $b := \sqrt{(n_g \cdot \sin(\Phi RF))^2 - (n_r^2)} \qquad b = 0.538022$ $c := n_c \cdot \cos(\Phi RF) \qquad c = 1.233$ $$\delta := \frac{4 \cdot \pi \cdot b \cdot Tr}{\lambda S} \qquad \delta = 5.633$$

$$R := \frac{(e^\delta + e^{-\delta}) \cdot ((a^2 + b^2) \cdot (b^2 + c^2)) + 2 \cdot ((a^2 - b^2) \cdot (b^2 - c^2) - 4 \cdot a \cdot b^2 \cdot c)}{(e^\delta + e^{-\delta}) \cdot ((a^2 + b^2) \cdot (b^2 + c^2)) + 2 \cdot ((a^2 - b^2) \cdot (b^2 - c^2) + 4 \cdot a \cdot b^2 \cdot c)} \qquad R = 0.995$$

Constructive Interference Fringe Constants $$F := \frac{4 \cdot R}{(1 - R)^2} \qquad F = 159179.951243$$

$$G := \frac{4 \cdot R^p}{(1 - R^p)^2} \qquad G = 94.361174$$

Constructive Interference Fringe 3db Beam Width $\delta \Psi := 0.1$ $i := 0, 1 \ldots 2000$ $$\Psi_i := \left(\Psi RF - \frac{\delta \Psi}{2}\right) + \frac{\delta \Psi \cdot i}{1000} \qquad \Psi_0 = 3499.95 \qquad \Psi_{2000} = 3500.15$$

$$I_i := \frac{1 + G \cdot \sin(\pi \cdot p \cdot \Psi_i)^2}{1 + F \cdot \sin(\pi \cdot \Psi_i)^2} \qquad I_0 = 8.493 \cdot 10^{-4} \quad I_{2000} = 6.232568158 \cdot 10^{-4}$$

$\text{Lim}_i := \text{if}(I_i < 0.5, 0, 1)$

-continued

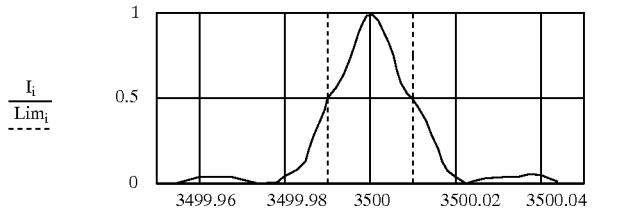

$\Psi_i$

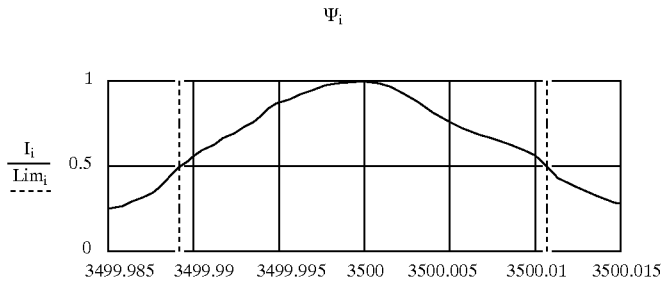

$\Psi_i$

Trailing 3db point of the constructive interference fringe  $\psi t := 3500.005$
TOL := .0000001

$$\Psi RFt3db := \text{root}\left[\left[\frac{1 + G \cdot (\sin(\pi \cdot p \cdot \psi t))^2}{1 + F \cdot (\sin(\pi \cdot \psi t))^2} - .5\right], \psi t\right] \qquad \Psi RFt3db = 3500.01082033$$

Leading 3db point of the constructive interference fringe  $\psi l := 3499.985$ $$\Psi RFl3db := \text{root}\left[\left[\frac{1 + G \cdot (\sin(\pi \cdot p \cdot \psi l))^2}{1 + F \cdot (\sin(\pi \cdot \psi l))^2} - .5\right], \psi l\right] \qquad \Psi RFl3db = 3499.98917967$$

$\Delta\Psi RF3db := \Psi RFt3db - \Psi RFl3db \qquad \Delta\Psi RF3db = 0.021640653$ $$\Phi RFt3db := \text{acos}\left(\frac{\Psi RFt3db \cdot \lambda S}{2 \cdot Teff \cdot n_g}\right) \qquad \Phi RFt3db = 0.608308132$$

$$\Phi RFl3db := \text{acos}\left(\frac{\Psi RFl3db \cdot \lambda S}{2 \cdot Teff \cdot n_g}\right) \qquad \Phi RFl3db = 0.60831701$$

$$\Theta RFt3db := \text{asin}\left(\frac{n_g \cdot \sin(\Phi RFt3db)}{n_c}\right) \qquad \Theta RFt3db = 1.404027$$

$$\Theta RFl3db := \text{asin}\left(\frac{n_g \cdot \sin(\Phi RFl3db)}{n_c}\right) \qquad \Theta RFl3db = 1.404103$$

$$\zeta RFt3db := \text{asin}\left(\frac{n_o \cdot \cos(\Theta RFt3db)}{n_e}\right) \qquad \zeta RFt3db = 0.251985892$$

$$\zeta RFl3db := \text{asin}\left(\frac{n_o \cdot \cos(\Theta RFl3db)}{n_e}\right) \qquad \zeta RFl3db = 0.251870031$$

-continued

Stylus Fringe 3db beam width in disc space $\Delta\zeta RF3db := \zeta RFt3db - \zeta RFl3db \qquad \Delta\zeta RF3db = 0.000115862$
Diameter (3db) of the Stylus Fringe on the surface of the disc $df := \Delta\zeta RF3db \cdot fl \qquad df = 0.000406$

| Input Beam Angle Trailing Fringe | |
|---|---|
| $\Psi tRF := \Psi RF + 1 + \dfrac{\Delta\Psi RF3db}{2}$ | $\Psi tRF = 3501.01082$ |
| $\Phi tRF := acos\left(\dfrac{\Psi tRF \cdot \lambda S}{2 \cdot Teff \cdot n_g}\right)$ | $\Phi tRF = 0.607897741$ |
| $\xi tRF := asin\left(\dfrac{n_g \cdot sin(\Phi RF - \Phi tRF)}{n_e}\right)$ | $\xi tRF = 0.001075157$ |
| Input Beam Angle Leading Fringe | |
| $\Psi lRF := \Psi RF - 1 - \left(\dfrac{\Delta\Psi RF3db}{2}\right)$ | $\Psi lRF = 3498.98918$ |
| $\Phi lRF := acos\left(\dfrac{\Psi lRF \cdot \lambda S}{2 \cdot Teff \cdot n_g}\right)$ | $\Phi lRF = 0.608727154$ |
| $\xi lRF := asin\left(\dfrac{n_g \cdot sin(\Phi RF - \Phi lRF)}{n_e}\right)$ | $\xi lRF = -0.001074517$ |
| $\Delta\xi RF := \xi tRF - \xi lRF$ | $\Delta\xi RF = 0.002149673$ |
| Output Beam Angle Trailing Fringe | |
| $\Theta tRF := asin\left(\dfrac{n_g \cdot sin(\Phi tRF)}{n_c}\right)$ | $\Theta tRF = 1.400562$ |
| $\zeta tRF := asin\left(\dfrac{n_o \cdot cos(\Theta tRF)}{n_e}\right)$ | $\zeta tRF = 0.257289$ |
| Output Beam Angle Leading Fringe | |
| $\Theta lRF := asin\left(\dfrac{n_g \cdot sin(\Phi lRF)}{n_c}\right)$ | $\Theta lRF = 1.40764$ |
| $\zeta lRF := asin\left(\dfrac{n_o \cdot cos(\Theta lRF)}{n_e}\right)$ | $\zeta lRF = 0.246463$ |
| $\Delta\zeta RF := \zeta tRF - \zeta lRF$ | $\Delta\zeta RF = 0.010825917$ |

Single Fringe System
Fringe Probe located at the center of the pit

| | |
|---|---|
| $DsFP := DRF - 2 \cdot Tp$ | $DsFP = 0.899988$ |
| $\zeta sFP := atan\left(\dfrac{DsFP}{fl}\right)$ | $\zeta sFP = 0.251687$ |

-continued

| | |
|---|---|
| $\phi sFP := asin\left(\dfrac{n_e \cdot sin(\zeta sFP)}{n_o}\right)$ | $\phi sFP = 0.166573$ |
| $\Theta sFP := \dfrac{\pi}{2} - \phi sFP$ | $\Theta sFP = 1.404223$ |
| $\Phi sFP := asin\left(\dfrac{n_c \cdot sin(\Theta sFP)}{n_g}\right)$ | $\Phi sFP = 0.608331$ |
| $\eta sFP := \dfrac{n_g \cdot sin(\Phi RF)}{sin(\Theta sFP)}$ | $\eta sFP = 1.50196$ |
| $VsFP := \dfrac{2 \cdot (n_c - \eta sFP) \cdot Tc}{r \cdot n_c^3}$ | $VsFP = 3687.133854$ |
| $\lambda sFP := \dfrac{2 \cdot Teff \cdot n_g \cdot cos(\Phi sFP)}{\Psi RF}$ | $\lambda sFP = 0.632791859$ |
| $\nu sFP := \dfrac{C}{\lambda sFP}$ | $\nu sFP = 4.740895 \cdot 10^{14}$ |
| $\Delta\nu sFP := \nu sFP - \nu S$ | $\Delta\nu sFP = 6.099 \cdot 10^9$ |
| $HsFP := Zk \cdot (\Delta\nu sFP)$ | $HsFP = 4.356608 \cdot 10^3$ |
| $\lambda ZsFP := \dfrac{C}{\nu S - \Delta\nu sFP}$ | $\lambda ZsFP = 0.632808141$ |

Fringe Probe located at the trailing edge of the pit

| | |
|---|---|
| $DsFtP := DsFP + \dfrac{dp}{2}$ | $DsFtP = 0.900138$ |
| $\zeta sFtP := atan\left(\dfrac{DsFtP}{fl}\right)$ | $\zeta sFtP = 0.251727$ |
| $\phi sFtP := asin\left(\dfrac{n_e \cdot sin(\zeta sFtP)}{n_o}\right)$ | $\phi sFtP = 0.1666$ |
| $\Theta sFtP := \dfrac{\pi}{2} - \phi sFtP$ | $\Theta sFtP = 1.404197$ |
| $\Phi sFtP := asin\left(\dfrac{n_c \cdot sin(\Theta sFtP)}{n_g}\right)$ | $\Phi sFtP = 0.608328$ |
| $\eta sFtP := \dfrac{n_g \cdot sin(\Phi RF)}{sin(\Theta sFtP)}$ | $\eta sFtP = 1.501967$ |
| $VsFtP := \dfrac{2 \cdot (n_c - \eta sFtP) \cdot Tc}{r \cdot n_c^3}$ | $VsFtP = 3072.824311$ |

-continued $$\lambda sFtP := \frac{2 \cdot Teff \cdot n_g \cdot \cos(\Phi sFtP)}{\Psi RF} \qquad \lambda sFtP = 0.632793215$$

$$\nu sFtP := \frac{C}{\lambda sFtP} \qquad \nu sFtp = 4.740885 \cdot 10^{14}$$

$$\Delta \nu sFtP := \nu sFtP - \nu S \qquad \Delta \nu sFtP = 5.083 \cdot 10^9$$
$$HsFtP := Zk \cdot (\Delta \nu sFtP) \qquad HsFtP = 3.630722 \cdot 10^3$$

$$\lambda ZsFtP := \frac{C}{\nu S - \Delta \nu sFtP} \qquad \lambda ZsFtP = 0.632807$$

Fringe Probe located at the leading edge of the pit $$DsFlP := DsFP + \frac{dp}{2} \qquad DsFlP = 0.899838$$

$$\zeta sFlP := \operatorname{atan}\left(\frac{DsFlP}{fl}\right) \qquad \zeta sFlP = 0.251647$$

$$\phi sFlP := \operatorname{asin}\left(\frac{n_e \cdot \sin(\zeta sFlP)}{n_o}\right) \qquad \phi sFlP = 0.166547$$

$$\Theta sFlP := \frac{\pi}{2} - \phi sFlP \qquad \Theta sFlP = 1.404249$$

$$\Phi sFlP := \operatorname{asin}\left(\frac{n_c \cdot \sin(\Theta sFlP)}{n_g}\right) \qquad \Phi sFlP = 0.608334$$

$$\eta sFlP := \frac{n_g \cdot \sin(\Phi RF)}{\sin(\Theta sFlP)} \qquad \eta sFlP = 1.501954$$

$$VsFlP := \frac{2 \cdot (n_c - \eta sFlP) \cdot Tc}{r \cdot n_c^3} \qquad VsFlP = 4301.358$$

$$\lambda sFlP := \frac{2 \cdot Teff \cdot n_g \cdot \cos(\Phi sFlP)}{\Psi RF} \qquad \lambda sFlP = 0.6327905$$

$$\nu sFlP := \frac{C}{\lambda sFlP} \qquad \nu sFlP = 4.740906 * 10^{14}$$

$$\Delta \nu sFlP := \nu sFlP - \nu S \qquad \Delta \nu sFlP = 7.115 * 10^9$$
$$HsFlP := Zk \cdot (\Delta \nu sFlP) \qquad HsFlP = 5.082407 * 10^3$$

$$\lambda ZsFlP := \frac{C}{\nu S - \Delta \nu sFlP} \qquad \lambda ZsFlP = 0.632809$$

Multiple Fringe Single Probe System $$DSF := DRF - Tp \qquad DSF = 0.900438$$

$$\zeta SF := \operatorname{atan}\left(\frac{DSF}{fl}\right) \qquad \zeta SF = 0.251807$$

$$\phi SF := \operatorname{asin}\left(\frac{n_e \cdot \sin(\zeta SF)}{n_o}\right) \qquad \phi SF = 0.166652$$

$$\Theta SF := \frac{\pi}{2} - \phi SF \qquad \Theta SF = 1.404144$$

$$\Phi SF := \operatorname{asin}\left(\frac{n_c \cdot \sin(\Theta SF)}{n_g}\right) \qquad \Phi SF = 0.608322$$

$$\eta SF := \frac{n_g \cdot \sin(\Phi RF)}{\sin(\Theta SF)} \qquad \eta SF = 1.50198$$

$$VSF := \frac{2 \cdot (n_c - \eta SF) \cdot Tc}{r \cdot n_c^3} \qquad VSF = 1843.949882$$

$$\zeta \mu \delta FP := \zeta RF + \zeta sFP - \zeta SF \qquad \zeta \mu \delta FP = 0.251807$$

$$\phi \mu \delta FP := \operatorname{asin}\left(\frac{n_e \cdot \sin(\zeta \mu \delta FP)}{n_o}\right) \qquad \phi \mu \delta FP = 0.166652$$

$$\Theta \mu \delta FP := \frac{\pi}{2} - \phi \mu \delta FP \qquad \Theta \mu \delta FP = 1.404144$$

$$\Phi \mu \delta FP := \operatorname{asin}\left(\frac{n_c \cdot \sin(\Theta \mu \delta FP)}{n_g}\right) \qquad \Phi \mu \delta FP = 0.608322$$

$$\lambda \mu \delta FP := \frac{2 \cdot Teff \cdot n_g \cdot \cos(\Theta \mu \delta FP)}{\Psi RF} \qquad \lambda \mu \delta FP = 0.632796$$

$$\nu \mu \delta FP := \frac{C}{\lambda \mu \delta FP} \qquad \nu \mu \delta FP = 4.740865 \cdot 10^{14}$$

$$\Delta \nu \mu \delta FP := \nu \mu \delta FP - \nu S \qquad \Delta \nu \mu \delta FP = 3.050358 \cdot 10^9$$
$$H \mu \delta FP := Zk \cdot (\Delta \nu \mu \delta FP) \qquad H \mu \delta FP = 2178.827142$$
$$\nu \mu \delta FP := \nu S - \Delta \nu \mu \delta FP \qquad \nu \mu \delta FP = 4.740804 \cdot 10^{14}$$

$$\lambda Z \mu \delta FP := \frac{C}{\nu \mu \delta FP} \qquad \lambda Z \mu \delta FP = 0.632804$$

Mutiple Fringe Dual Probe System
Center of the Trailing Fringe Probe located at the trailing edge of the pit $$DmFtP := DRF - Tp + \frac{dp}{2} \qquad DmFtP = 0.900588$$

$$\zeta mFtP := \operatorname{atan}\left(\frac{DmFtP}{fl}\right) \qquad \zeta mFtP = 0.251848$$

$$\phi mFtP := \operatorname{asin}\left(\frac{n_e \cdot \sin(\zeta mFtP)}{n_o}\right) \qquad \phi mFtP = 0.166679$$

$$\Theta mFtP := \frac{\pi}{2} - \phi mFtP \qquad \Theta mFtP = 1.404118$$

$$\Phi mFtP := \operatorname{asin}\left(\frac{n_c \cdot \sin(\Theta mFtP)}{n_g}\right) \qquad \Phi mFtP = 0.608319$$

$$\eta mFtP := \frac{n_g \cdot \sin(\Phi RF)}{\sin(\Theta mFtP)} \qquad \eta mFtP = 1.501987$$

$$VmFtP := \frac{2 \cdot (n_c - \eta mFtP) \cdot Tc}{r \cdot n_c^3} \qquad VmFtP = 1229.385012$$

$$\lambda mFtP := \frac{2 \cdot Teff \cdot n_g \cdot \cos(\Phi mFtP)}{\Psi RF} \qquad \lambda mFtP = 0.632797$$

-continued $$\nu mFtP := \frac{C}{\lambda mFtP}$$  $\nu mFtP = 4.740855 \cdot 10^{14}$ $\Delta \nu mFtP := \nu mFtP - \nu S$  $\Delta \nu mFtP = 2.033567 \cdot 10^{9}$
$HmFtP := Zk \cdot (\Delta \nu mFtP)$  $HmFtP = 1452.547554$ Center of the Leading Fringe Probe located at the leading edge of the pit $$DmFlP := DRF - Tp - \frac{dp}{2}$$  $DmF1P = 0.900288$ $$\zeta mFlP := atan\left(\frac{DmFlP}{fl}\right)$$  $\zeta mF1P = 0.251767$ $$\varphi mFlP := asin\left(\frac{n_c \cdot \sin(\zeta mFlP)}{n_o}\right)$$  $\varphi mF1P = 0.166626$ $$\Theta mFlP := \frac{\pi}{2} - \varphi mFlP$$  $\Theta mF1P = 1.40417$ $$\Phi mFlP := asin\left(\frac{n_c \cdot \sin(\Theta mFlP)}{n_g}\right)$$  $\Phi mF1P = 0.608325$ $$\eta mFlP := \frac{n_g \cdot \sin(\Phi RF)}{\sin(\Phi mFlP)}$$  $\eta mF1P = 1.501973$ $$VmFlP := \frac{2 \cdot (n_c - \eta mFlP) \cdot Tc}{r \cdot n_c^3}$$  $VmF1P = 2458.429651$ $$\lambda mFlP := \frac{2 \cdot Teff \cdot n_g \cdot \cos(\Phi mFlP)}{\Psi RF}$$  $\lambda mF1P = 0.632795$ $$\nu mFlP := \frac{C}{\lambda mFlP}$$  $\nu mF1P = 4.740875 \cdot 10^{14}$ $\Delta \nu mF1P := \nu mF1P - \nu S$  $\Delta \nu mF1P = 4.06665 \cdot 10^{9}$
$HmF1P := Zk \cdot (\Delta \nu mF1P)$  $HmF1P = 2904.750159$
$\zeta \mu \delta mFtP := \zeta RF + \zeta sFtP - \zeta SF$  $\zeta \mu \delta mFtP = 0.251847572$ $$\varphi \mu \delta mFtP := asin\left(\frac{n_c (\zeta \mu \delta mFtP)}{n_o}\right)$$  $\Phi \mu \delta mFtP = 0.166679$ $$\Theta \mu \delta mFtP := \frac{\pi}{2} - \varphi \mu \delta mFtP$$  $\theta \mu \delta mFtP = 1.404118$ $$\Phi \mu \delta mFtP := asin\left(\frac{n_c \cdot \sin(\Theta \mu \delta mFtP)}{n_g}\right)$$  $\Phi \mu \delta mFtP = 0.608319$ $$\lambda \mu \delta mFtP := \frac{2 \cdot Teff \cdot n_g \cdot \cos(\Phi \mu \delta mFtP)}{\Psi RF}$$  $\lambda \mu \delta mFtP = 0.632797285$ $$\nu \mu \delta mFtP := \frac{C}{\lambda \mu \delta mFtP}$$  $\nu \mu \delta mFtP = 4.740855 \cdot 10^{14}$ $\Delta \nu \mu \delta mFtP := \nu \mu \delta mFtP - \nu S$  $\Delta \nu \mu \delta mFtP = 2.033693 \cdot 10^{9}$
$H\mu \delta mFtP := Zk \cdot (\Delta \nu \mu \delta mFtP)$  $H\mu \delta mFtP = 1452.637678$
$\nu Z\mu \delta mFtP := \nu S + \Delta \nu \mu \delta mFtP$  $\nu Z\mu \delta mFtP = 4.740855 \cdot 10^{14}$ $$\lambda Z\mu \delta mFtP := \frac{C}{\nu Z\mu \delta mFtP}$$  $\lambda Z\mu \delta mFtP = 0.632797$ $\zeta \mu \delta mF1P := \zeta RF + \zeta sF1P - \zeta SF$  $\zeta \mu \delta mF1P = 0.251767$ -continued $$\varphi \mu \delta mF1P := asin\left(\frac{n_c \cdot \sin(\zeta \mu \delta mF1P)}{n_o}\right)$$  $\varphi \mu \delta mF1P = 0.166626$ $$\Theta \mu \delta mF1P := \frac{\pi}{2} - \varphi \mu \delta mF1P$$  $\theta \mu \delta mF1P = 1.40417$ $$\Phi \mu \delta mF1P := asin\left(\frac{n_c \cdot \sin(\Theta \mu \delta mF1P)}{n_g}\right)$$  $\Phi \mu \delta mF1P = 0.608325$ $$\lambda \mu \delta mF1P := \frac{2 \cdot TEFF \cdot n_g \cdot \cos(\Phi \mu \delta mF1P)}{\Psi RF}$$  $\lambda \mu \delta mF1P = 0.632795$ $$\nu \mu \delta mF1P := \frac{C}{\lambda \mu \delta mF1P}$$  $\nu \mu \delta mF1P = 4.740875 \cdot 10^{14}$ $\Delta \nu \mu \delta mF1P := \nu \mu \delta mF1P - \nu S$  $\Delta \nu \mu \delta mF1P = 4.066903 \cdot 10^{9}$
$H\mu \delta mF1P := Zk \cdot (\Delta \nu \mu \delta mF1P)$  $H\mu \delta mF1P = 2904.930335$
$\nu Z\mu \delta mF1P := \nu S + \Delta \nu \mu \delta mF1P$  $\nu Z\mu \delta mF1P = 4.740875 \cdot 10^{14}$ $$\lambda Z\mu \delta mF1P := \frac{C}{\nu Z\mu \delta mF1P}$$  $\lambda Z\mu \delta mF1P = 0.632795$ $$\xi sFP := asin\left(\frac{n_g \cdot \sin(\Phi RF - \Phi sFP)}{n_e}\right)$$  $\xi sFP = -4.787919 \cdot 10^{-5}$ $$\xi sFtP := asin\left(\frac{n_g \cdot \sin(\Phi RF - \Phi sFtP)}{n_e}\right)$$  $\xi sFtP = -3.990187 \cdot 10^{-5}$ $$\xi sF1P := asin\left(\frac{n_g \cdot \sin(\Phi RF - \Phi sF1P)}{n_e}\right)$$  $\xi sF1P = -5.585549 \cdot 10^{-5}$ $$\xi SF := asin\left(\frac{n_g \cdot \sin(\Phi RF - \Phi SF)}{n_e}\right)$$  $\xi SF = -2.394417 \cdot 10^{-5}$ $$\xi \varphi \mu \delta FP := asin\left(\frac{n_g \cdot \sin(\Phi RF - \Phi \varphi \mu \delta FP)}{n_e}\right)$$  $\xi \varphi \mu \delta FP = -2.394566 \cdot 10^{-5}$ $$\xi mFtP := asin\left(\frac{n_g \cdot \sin(\Phi RF - \Phi mFtP)}{n_e}\right)$$  $\xi mFtP = -1.59638 \cdot 10^{-5}$ $$\xi mF1P := asin\left(\frac{n_g \cdot \sin(\Phi RF - \Phi mF1P)}{n_e}\right)$$  $\xi mF1P = -3.192353 \cdot 10^{-5}$ $$\xi \mu \delta FP := asin\left(\frac{n_g \cdot \sin(\Phi RF - \Phi \mu \delta FP)}{n_e}\right)$$  $\xi \mu \delta FP = -2.394566 \cdot 10^{-5}$ $$\xi \mu \delta mFtP := asin\left(\frac{n_g \cdot \sin(\Phi RF - \Phi \mu \delta mFtP)}{n_e}\right)$$  $\xi \mu \delta mFtP = -1.596479 \cdot 10^{-5}$ $$\xi \mu \delta mF1P := asin\left(\frac{n_g \cdot \sin(\Phi RF - \Phi \mu \delta mF1P)}{n_e}\right)$$  $\xi \mu \delta mF1P = -3.192551 \cdot 10^{-5}$ $\nu sFP := \Phi RF - \Phi sFP$  $\nu sFP = -0.000018473$
$\nu sFtP := \Phi RF - \Phi sFtP$  $\nu sFtP = -0.000015495$
$\nu sF1P := \Phi RF - \Phi sF1P$  $\nu sF1P = -0.000021551$
$\nu SF := \Phi RF - \Phi SF$  $\nu SF = -0.000009238$
$\nu \mu \delta FP := \Phi RF - \Phi \mu \delta FP$  $\nu \mu \delta FP = -0.000009239$
$\nu mFtP := \Phi RF - \Phi mFtP$  $\nu mFtP = -0.000006159$
$\mu mF1P := \Phi RF - \Phi mF1P$  $\nu mF1P = -0.000012317$
$\nu \mu \delta FP := \Phi RF - \Phi \mu \delta FP$  $\nu \mu \delta FP = -0.000009239$
$\nu \mu \delta FtP := \Phi RF - \Phi \mu \delta mFtP$  $\nu \mu \delta FtP = -0.00000616$
$\nu \mu \delta F1P := \Phi RF - \Phi \mu \delta mF1P$  $\nu \mu \delta F1P = -0.000012318$

I claim:
1. An optical device to read data on an optical disc and inscribe data recorded on said optical disc comprising in combination:
   a) means for generating one of a cone of light rays and a pencil of rays:

b) an interferometer regenerating said pencil of rays into one of a plurality of pencils of rays and a bundle of rays;

c) means for deflecting said bundle of rays;

d) means for converging said bundle of rays into a constructive interference fringe on said optical disc;

e) means for collecting light rays from said optical disc on a light sensor.

2. The apparatus of claim 1 wherein the means for generating said pencil of rays is a spectral source.

3. The apparatus of claim 2 wherein the said spectral source is a visible source.

4. The apparatus of claim 2 wherein the said spectral source is an ultra violet source.

5. The apparatus of claim 1 wherein the interferometer is a Lummer-Gehrcke interferometer.

6. The apparatus of claim 1 wherein the interferometer is a Fabry-Perot interferometer.

7. The apparatus of claim 1 wherein the means for regenerating said pencil of rays is a leaky asymmetric slab waveguide.

8. The apparatus of claim 1 wherein the means for deflecting said bundle of rays is an electro-optical cell means.

9. The apparatus of claim 8 wherein the location of said constructive interference fringe is a function of the strength of an electric field inside said electro-optic means for deflecting said bundle of rays.

10. The apparatus of claim 1 wherein the means for regenerating said pencil of rays is optically coupled to the means for deflecting said bundle of rays.

11. The apparatus of claim 1 wherein the location of said constructive interference fringe is a function of the wavelength of said constructive interference fringe.

12. The apparatus of claim 11 wherein the wavelength of said constructive interference fringe is controlled by the strength of a magnetic field inside the means for generating said pencil of rays.

13. The apparatus of claim 11 wherein the wavelength of said set of rays is controlled by the strength of an electric field inside the means for generating said pencil of rays.

14. The apparatus of claim 1 wherein the means for regenerating said pencil of rays is an electro-optic interferometer.

15. The apparatus of claim 14 wherein the location of said constructive fringe is a function of the strength of an electric field inside said electro-optic interferometer.

16. The apparatus of claim 1 wherein the means for deflecting said bundle of rays is a magneto-optical cell means.

17. The apparatus of claim 16 wherein the location of said constructive interference fringe is a function of the strength of a magnetic field inside said magneto-optic means for deflecting said bundle of rays.

18. The apparatus of claim 1 wherein said means for generating a pencil of rays are multiple means for generating multiple pencils of rays.

19. The apparatus of claim 18 wherein one of the multiple pencils of rays is an optical probe employed to track and read data on said optical disc and any number of said pencils of rays are optical scribes employed to inscribe data on said optical disc.

20. The apparatus of claim 19 wherein two of the pencils of rays are optical probes employed to track and read data on said optical disc and one is an optical scribe employed to inscribe data on said optical disc.

21. The apparatus of claim 18 wherein the multiple pencils of rays can be independently controlled on said optical disc by separately controlling the strength of electric or magnetic fields inside means for generating said pencils of rays.

22. The apparatus of claim 18 wherein all of said pencils of rays can be collectively controlled on said optical disc by controlling the strength of either an electric or magnetic field inside said means for deflecting said pencils of rays.

23. The apparatus of claim 1 wherein the means for collecting light rays from said optical disc is a lens.

24. The apparatus of claim 1 wherein the location of said interference fringe is a function of the angle of said rays inside said means for regenerating said pencil of rays.

25. The apparatus of claim 1 wherein the means for converging the bundle of rays is a lens.

26. The apparatus of claim 1 wherein the means for generating a pencil of rays are three means for generating three pencils of rays.

27. The apparatus of claim 1 wherein the means for generating said pencil of rays is a laser.

28. A method of tracking a data track spiral on an optical disc comprising the steps of:

a) producing multiple constructive interference fringes on said optical disc;

b) positioning said multiple constructive interference fringes orthogonally across said data track spiral;

c) detecting and interpreting signals from said optical disc;

d) defining the center of said data track spiral relative to the center of said multiple constructive interference fringes; and e) generating an error voltage to control the positions of said multiple constructive interference fringes.

29. A method of reading data on an optical disc inscribed with data comprising the steps of:

a) producing a constructive interference fringe on said optical disc;

b) detecting said light rays from said optical disc produced by said constructive interference fringe; and c) interpreting intensity variations in said detected light rays.

30. The method of claim 29, wherein the constructive interference fringe is produced by a Fabry-Perot Interferometer.

31. The method of claim 29, wherein the constructive interference fringe is produced by a Lummer-Gehrcke Interferometer.

32. A method of inscribing multiple data track spirals on an optical disc comprising the steps of:

a) tracking an inscribed data track spiral on said optical disc;

b) producing multiple variable intensity constructive interference fringes on virgin areas of said optical disc;

c) controlling the distance between a tracking fringe following the inscribed data track spiral and said multiple variable intensity constructive interference fringes on said optical disc.

33. A method of inscribing a data track spiral on an optical disc comprising the steps of:

a) producing a variable intensity constructive interference fringe on the virgin area of said optical disc;

b) controlling the radial position of said variable intensity constructive interference fringe on said optical disc.

c) varying the intensity of said variable intensity constructive interference fringe to inscribe said data track spiral.

34. A method of inscribing multiple data track spirals on an optical disc comprising the steps of:
   a) producing multiple variable intensity constructive interference fringes on virgin areas of said optical disc for inscribing said data track spirals;
   b) controlling the radial position of said variable intensity constructive interference fringes on said optical disc.
   c) varying the intensity of each said variable intensity constructive interference fringes to inscribe said data track spirals.

35. A method of reading multiple data track spirals on an optical disc inscribed with data comprising the steps of:
   a) producing multiple constructive interference fringes on said optical disc;
   b) detecting light rays from said optical disc produced by said multiple constructive interference fringe; and
   c) interpreting intensity variations in said detected light rays.

36. The method of claim 35, wherein the constructive interference fringe is produced by a Lummer-Gehrcke Interferometer.

37. The method of claim 35, wherein the constructive interference fringe is produced by a Fabry-Perot Interferometer.

38. A method of tracking a data track spiral on an optical disc comprising the steps of:
   a) generating phased related geometrically degraded amplitude rays;
   b) producing a constructive interference fringe from said phased related geometrically degraded amplitude rays on said optical disc;
   c) oscillating said constructive interference fringe orthogonally across said data track spiral;
   d) detecting and interpreting variations in light intensity from said optical disc; and
   e) generating an error voltage to change the position of said constructive interference fringe on said optical disc.

39. A method of inscribing a data track spiral on an optical disc comprising the steps of:
   a) tracking an inscribed data track spiral on said optical disc;
   b) producing a variable intensity constructive interference fringe on the virgin area of said optical disc;
   c) controlling the distance between a tracking fringe following an inscribed data track spiral and said variable intensity constructive interference fringe on said optical disc.

* * * * *